United States Patent

Webb

[11] 4,036,468
[45] July 19, 1977

[54] BUTTERFLY VALVE WITH SELF ENERGIZING SEAL

[75] Inventor: Anthony M. Webb, Tulsa, Okla.

[73] Assignee: Tesco Engineering Company, Tulsa, Okla.

[21] Appl. No.: 618,126

[22] Filed: Sept. 30, 1975

[51] Int. Cl.² ............................................. F16K 25/00
[52] U.S. Cl. ..................................... 251/84; 251/148; 251/173; 251/307
[58] Field of Search ............................ 137/527, 527.4; 251/304, 305, 306, 307, 308, 172, 173, 84, 148

[56] References Cited

U.S. PATENT DOCUMENTS

| | | | |
|---|---|---|---|
| 2,924,424 | 2/1960 | Titerington | 251/305 |
| 3,233,861 | 2/1966 | Stillwagon | 251/306 X |
| 3,250,510 | 5/1966 | Williams | 251/173 |
| 3,282,558 | 11/1966 | Swain | 251/173 X |
| 3,314,642 | 4/1967 | Kautz | 251/307 |
| 3,356,336 | 12/1967 | Maenaka | 251/306 |
| 3,475,007 | 10/1969 | Fawkes | 251/305 |

Primary Examiner—Harold W. Weakley
Attorney, Agent, or Firm—Daniel Silverman

[57] ABSTRACT

An improved butterfly valve with self energizing seal, having a body with parallel faces and a substantially circular opening therethrough, and a shaft transverse to said opening. A closure disc is rigidly attached to said shaft and spaced from said shaft a selected distance, with its plane parallel to a plane through the axis of said shaft. A seal ring, comprising a thin cylindrical metal ring with an elastomeric ring bonded to the inside surface thereof, is inserted into the upstream face of said body. The elastomeric ring has an internal seating surface which is a truncated conical surface, tapering upstream, and which is tangent to a spherical surface centered at the intersection of the axes of said opening and said shaft. The edge of the closure disc is in the form of a ridge, having a peak which is circular in crosssection. When the valve is closed, by rotating the shaft, the disc is in the plane of the seating surface and the ridge has a small radial penetration into the elastomeric surface. With pressure on the upstream face, the seal is self energizing.

6 Claims, 3 Drawing Figures

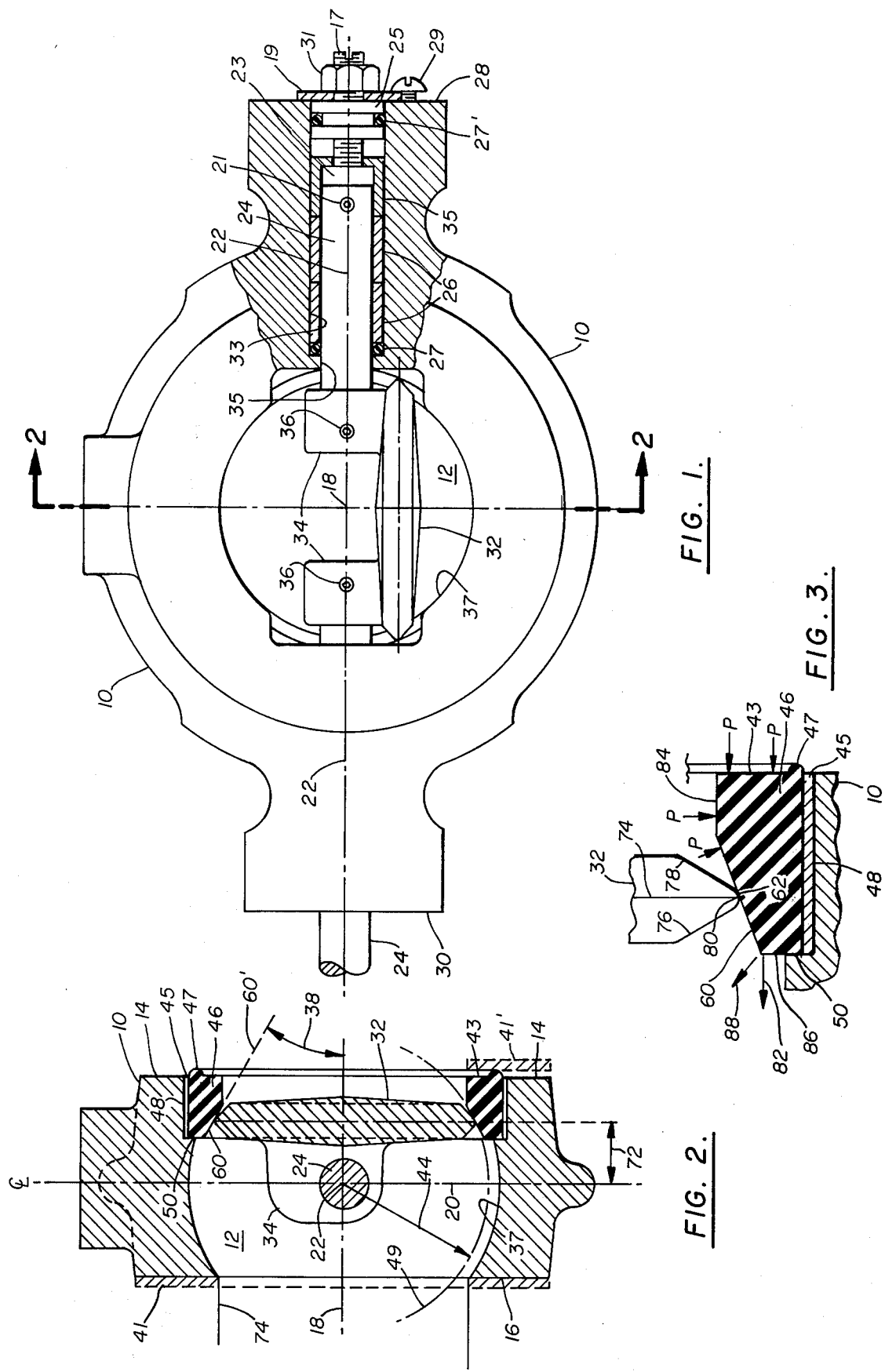

BUTTERFLY VALVE WITH SELF ENERGIZING SEAL

BACKGROUND OF THE INVENTION

This invention lies in the field of fluid valves. More particularly it concerns the type of value known as the butterfly valve, which has a limited axial width, and is installed in a line by clamping between pipe flanges.

Still more particularly it is concerned with a type of butterfly valve in which the valve can be closed and sealed with minimum torque on the operating shaft, while providing a positive self energizing seal.

In the prior art butterfly valves have been designed with rotatable closure discs having ridged edges. However, in these valves, the plane of the disc is at an angle to the shaft. With this geometry it is impossible to provide a self energizing seal. Therefore, to provide a positive seal, it is necessary to make the disc considerably oversize, so as to penetrate a sufficient distance into the elastomeric seating surface to develop sufficient internal pressue to provide the necessary seal against the pressure of the fluid flowing through the valve.

SUMMARY OF THE INVENTION

It is a primary object of this invention to provide a butterfly valve having a minimum of closure friction.

It is a further object to provide a butterfly valve having a self energizing seal. It is a still further object to provide a butterfly valve having means to precisely center the disc in its seat.

These and other objects are realized and the limitations of the prior art are overcome in this invention by providing a butterfly valve in which there is a circular opening through the body and an operating shaft with its axis intersecting the axis of said opening.

The seal means is an elastomeric ring inserted into the upstream face of the body. It has a seating surface on the inner surface of the ring, which is a conical surface tapering upstream. The conical surface is tangent to a sperhical surface centered at the intersection of the axes of said opening and shaft.

The closure disc is attached to the shaft, and spaced a selected distance, with the plane of the disc parallel to the axis of the shaft. The edge of the disc is in the form of a ridge, with the peak rounded with a circular cross section. With the valve closed, the disc is in the plane of the seating surface, with the ridge having a small penetration into the surface of the elastomeric ring. Because of the normally small penetration it is important to precisely center the disc in the seal ring, and means are provided for doing this.

BRIEF DESCRIPTION OF THE DRAWINGS

These and other objects and advantages of this invention and a better understanding of the principles and details of the invention will be evident from the following description taken in conjunction with the appended drawings, in which:

FIG. 1 and 2 show two views of the butterfly valve of this invention.

FIG. 3 shows a detail of the contact between the closure disc and the seal ring.

DESCRIPTION OF THE PREFERRED EMBODIMENT

Referring now to the drawings, FIGS. 1 and 2 show two views of the preferred embodiment of this invention. There is a housing or body 10 which has a substantially circular opening 12 therethrough. The main portion of the body is roughly circular in shape, with two diametral projections. These projections have end faces 28 and 30. There is a bored opening 35 with its axis 22 intersecting the axis 18 of the central opening.

There are parallel spaced faces 14 and 16 perpendicular to axis 18. One face, 14 is the upstream face. The two faces are adapted to have gaskets applied, such as shown as 41 on face 16 in dashed outline. The two gaskets are then clamped between the flanges of two spaced lengths of pipe, not shown.

In the upstream face 14 there is a counterbore 48, providing a shoulder 50. A seal ring is inserted into this counterbore and seated against the shoulder 50. The seal ring comprises a thin cylindrical ring 45 made of rigid material such as metal or phenolic material. This ring has an internal ring of elastomeric material 46 bonded to the inside surface. The shoulder 50 supports the edge of the ring 45 and part of the edge 86 of the elastomeric material of the internal ring 46 against longitudinal movement under the upstream fluid pressure. The elastomeric ring is in the shape of a rectangular crosssection, with an upstream face 43 which is roughly in the plane of face 14 of the body. The inner downstream corner is cut off in the shape of a truncated conical surface 60, which tapers upstream making the ring of constant wedge-shaped crosssection. This conical surface is tangent to a spherical surface centered at the intersection of axes 18 and 22. This is shown in FIG. 2 as trace 49 of radius 44. The conical angle 38 is a function of the displacement 72 upstream along the axis 18 from point 22. The presence of a conical surface is important in providing a self energizing seal, as will be explained fully in connection with FIG. 3. However, since the disc 32, which seals the opening through the seal ring, is parallel to a plane through the axis 22 of the shaft, it is necessary to displace the sealing surface 60 in order to provide space for the shaft 24, bushings 26, etc. This displacement is indicated by numeral 72.

The elastomeric material of which the seal ring is made can be any conventional material used for such purpose, such as neoprene, Teflon, Viton, Silicone, Buna N, or other material as required by the character of the fluid, temperature, etc.

The closure disc 32 has 2 projecting hubs 34 on its back surface, which are bored to receive the shaft 24 journaled in the bored opening 35. The shaft may be continuous. However, it is preferred to make the shaft in two parts, each pinned 36 or otherwise fastened to the hubs 34. This permits an increased flow opening through the valve in the open position.

Shown in FIGS. 2 and 3 is a circular ridge 47 of elastomeric material raised above the planar face 43 of the elastomeric ring. The purpose of the ridge is to provide a compressible part of the ring when a planar gasket, such as 41, is placed over the face 14 and seal ring, and a pipe flange, not shown, clamped across the valve. Because of the small exposed surface area of the ring it can be compressed by the gasket to a high internal pressure, so as to effectively seal leakage of fluid from inside the valve (and pipe) between the gasket and the ring.

The closure disc 32 has an edge in the form of a ridge of triangular crosssection, with the outer corner rounded in a circular shape. The diameter of the ridge, and the displacement 72, are such that the ridge surface is tangent to a spherical surface surface like 49, but of slightly greater radius than 44. This greater radius of the disc is a selected value, in the range of 0.015 to 0.025 inch, and generally of a value about 0.020 inch. This means that when the disc is in the position shown in FIG. 2, that the ridge will penetrate into the surface 60, by about 0.020 inch. This penetration is shown at point 62 in FIG. 3.

This slight penetration is enough to make a seal with the seating surface 60. In the prior art the penetration of the closure means into the elastomeric seating surface is many times the value of the selected penetration of 0.020 inch. This is required to create in the inside of the elastomeric material an internal pressure greater than the fluid pressure to be applied against the seating surface.

In this valve, the penetration required is only an amount to get a seal at low pressure. Then, as the fluid pressure rises, the design of the seal ring is such as to become self energizing.

In FIG. 3 is shown an enlarged view of the lower part of FIG. 2, showing a portion of the disc 32, the elastomeric ring 46, the backing ring 45 and the counterbore 48 and shoulder 50 in the body 10. As explained above, the ridge 80 of the disc 32 contacts and penetrates the surface 60 at point 62 by a selected small distance. When the valve is closed (as in FIG. 2) and there is pressure on the disc, there will be a pressure shown by arrows P over the surfaces 43, 84, and the upstream part of surface 60. Also, on the down stream side of the disc there is no pressure on surfaces 60 and 86, the part of the ring 46 extending above shoulder 50. Therefor, because of the elastomeric nature of the material, the pressure on the larger area upstream tends to force and squeeze the material between the surfaces 43, 84 and 60 under the parts 62 of the ridge 80, and, correspondingly, the surfaces 60 and 86 tend to move in accordance with arrows 88 and 82 and tend to be extruded in the gap between the ridge 80 and the shoulder 50. But, of course, because of the choice of stiffness of the elastomeric material, it cannot be extruded under the ridge due to the pressure P. But it does build up a compressive force in the elastomeric material at the ridge, which is greater than the pressure P, which effectively seals the contact between the elastomeric material and the disc.

Of course, when the pressue P is removed, the ring 46 assumes its original shape, with only a minor indentation of the ridge 80, and there is very little friction involved in rotating the disc to open the valve.

As described above, there is only a slight penetration of the resilient seat by the closure disc. This requires that the disc be precisely centered with respect to the seating surface. This is accomplished by a centering means on one end of the shaft 24. This is shown in FIG. 1.

As shown in FIG. 1, the original bored opening 35 is counterbored to a larger diameter 33. Bushings 26 are pressed into the bore, leaving space for the O ring 27. At the end of the shaft 24 is a circular cylindrical cup 35 having a central opening in the base, with a screw having a head 23 inserted through the opening. The cup, with the screw is placed over the end of the shaft, and fastened thereto by means such as the pin 21. There is just enough space between the end of the shaft and the cup base for the screw head to turn. A circular nut 25 having flange 19 has a circumferential groove carrying O ring 27'. The nut 25 has an axial threaded opening and is screwed onto the screw 23 and inserted into the bore 33, the O ring sealing against outside fluids. The nut is clamped to the face 28 by means such as screw 29.

By turning the screw 23 by means such as the slot 17 in its end, the shaft can be moved axially until the disc is centralized in the seating surface. When the shaft is finally positioned, the screw is locked by means of lock nut 31.

Not shown in FIG. 1, on the second side of opening 12 is a counterbore 33, bushings 26, O-ring, etc. corresponding to those on the first side. In addition there are means to seal the projection of shaft 24 through the surface 30, as is well known in the art. Operating means, not shown, are provided on the extended operating shaft 24, as are well known in the art, and need not be described further.

What has been described is a butterfly valve that closes with a minimum of torque due to the fact that the closure disc penetrates a relatively small distance into the elastomeric seating surface. However, the elastomeric sealing ring is so shaped that high pressure on the upstream face of the disc causes the material to tend to flow toward the disc. Since the material is tapered in the direction downstream, the wider portion tends to be squeezed in the space between the disc and the body, creating an internal pressure in the material which is greater than the fluid pressure. Thus, the seal is self energizing, the higher the applied fluid pressure, the higher the internal pressure, and the stronger the seal. This self energizing feature makes it possible to provide a very limited penetration of the disc into the seating surface, and thus necessitating a minimum of torque to close the valve.

While the invention has been described with a certain degree of particularity, it is manifest that many changes may be made in the details of construction and the arrangement of components. It is understood that the invention is not to be limited to the specific language used or the specific embodiments set forth herein by way of exemplifying the invention, but the invention is to be limited only by the scope of the attached claim or claims, including the full range of equivalency to which each element or step thereof is entitled.

What is claimed:

1. An improved butterfly valve for unidirectional flow of fluid comprising:
    a. a body having a substantially circular first opening therethrough, for the flow of fluid, and parallel faces perpendicular to the first axis of said first opening, one of said faces being an upstream face, and the other a downstream face, said housing adapted to be clamped between spaced parallel pipe flanges;
    b. a second cylindrical opening through said body, the second axis of said second opening intersecting, and perpendicular to, said first axis, and shaft means journalled in said second opening;
    c. a unitary circular ring seal means inserted and longitudinally immovably fixed in position by a shoulder into said body on said upstream face thereof, said seal means comprising a thin circular cylindrical ring of rigid material, and a circular ring of elastomeric material bonded to the internal surface of said cylindrical ring, at least part of the internal seating surface of said elastomeric material in the form of a cone, tapering toward said upstream surface, said conical surface tangent to a spherical surface centered at the intersection of said first and second axes; said elastomeric ring being constant in crosssection, and wedge shaped in crosssection with the wide portion of said wedge facing the high upstream fluid pressure; whereby the area of said wedge exposed to said high upstream fluid pressure, is greater than the area of said wedge exposed to the low downstream pressure;

d. closure disc means rigidly fastened to said shaft means and having a circular face, the edge of said disc in the form of a ridge, the peak of which is circular in crosssection, the plane through said ridge, when said valve is closed, is perpendicular to and coaxial with said first axis and upstream a selected distance from said second axis, with said ridge in limited penetration of said conical surface of said elastomeric material; whereby said ring seal is self energizing.

2. The butterfly valve as in claim 1 including means to axially move said shaft means so as to center said disc on said seating surface.

3. The butterfly valve as in claim 2 including;
a. cylindrical cup means having an axial opening in the base of said cup means;
b. screw means inserted through said opening with the screw head inside of and rotatable in said cup means;
c. means to position and fasten said cup means over one end of said shaft means, screw head having limited axial motion between the end of said shaft and the base of said cup;
d. first nut means on said screw means, and means to lock said first nut means to said body;
e. means exterior of said body to rotate said screw means; and
f. second nut means to lock said screw means.

4. The butterfly valve as in claim 1 in which the upstream face of said ring of elastomeric material is substantially in the plane of said upstream face of said body; and including a circular ridge of said elastomeric material on said upstream face of said ring;
whereby pressure of a gasket between said ridge and a pipe flange will compress said ridge, inducing a high internal pressure so as to seal the contact between said ring and said gasket.

5. The butterfly valve as in claim 1 in which the radial penetration of said ridge on said disc into the sealing surface of said elastomeric ring is in the range of 0.015 to 0.025 inch.

6. The butterfly valve as in claim 1 in which the radial penetration of said ridge on said disc into the sealing surface of said elastomeric ring is approximately 0.020 inch.

* * * * *